Sept. 17, 1957　　　　　J. MÜLLER　　　　　2,806,713
WHEEL SUSPENSION OF VEHICLES
Filed July 5, 1952　　　　　　　　　　3 Sheets-Sheet 1
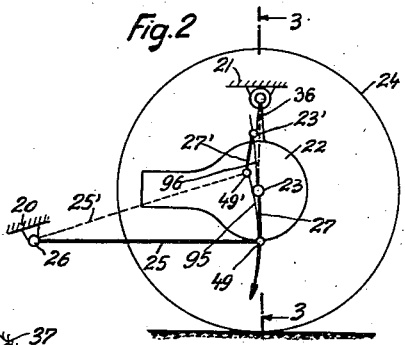
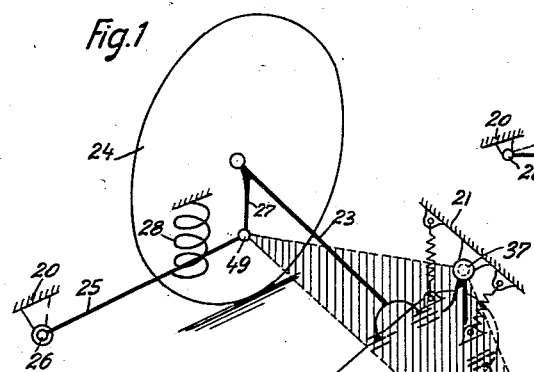
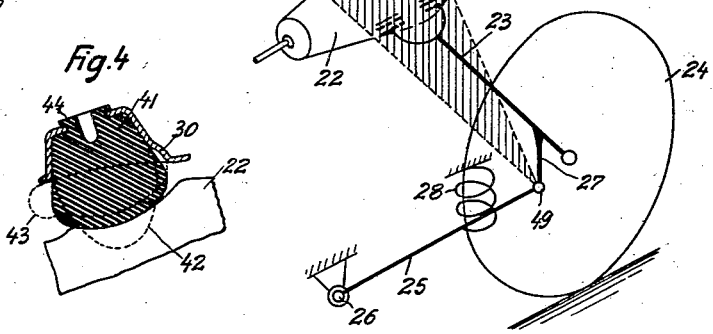
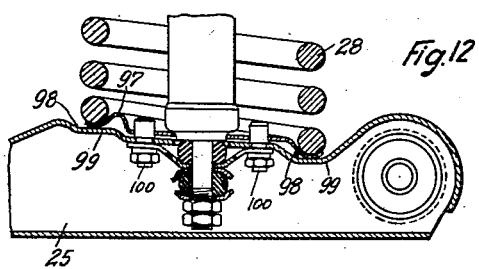
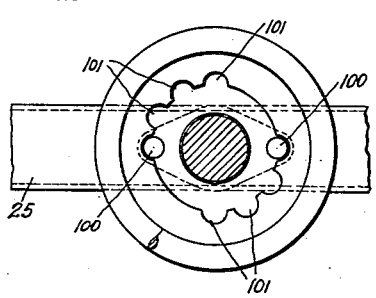
Inventor
Josef Müller
By Dicke and Padlon
Attorneys

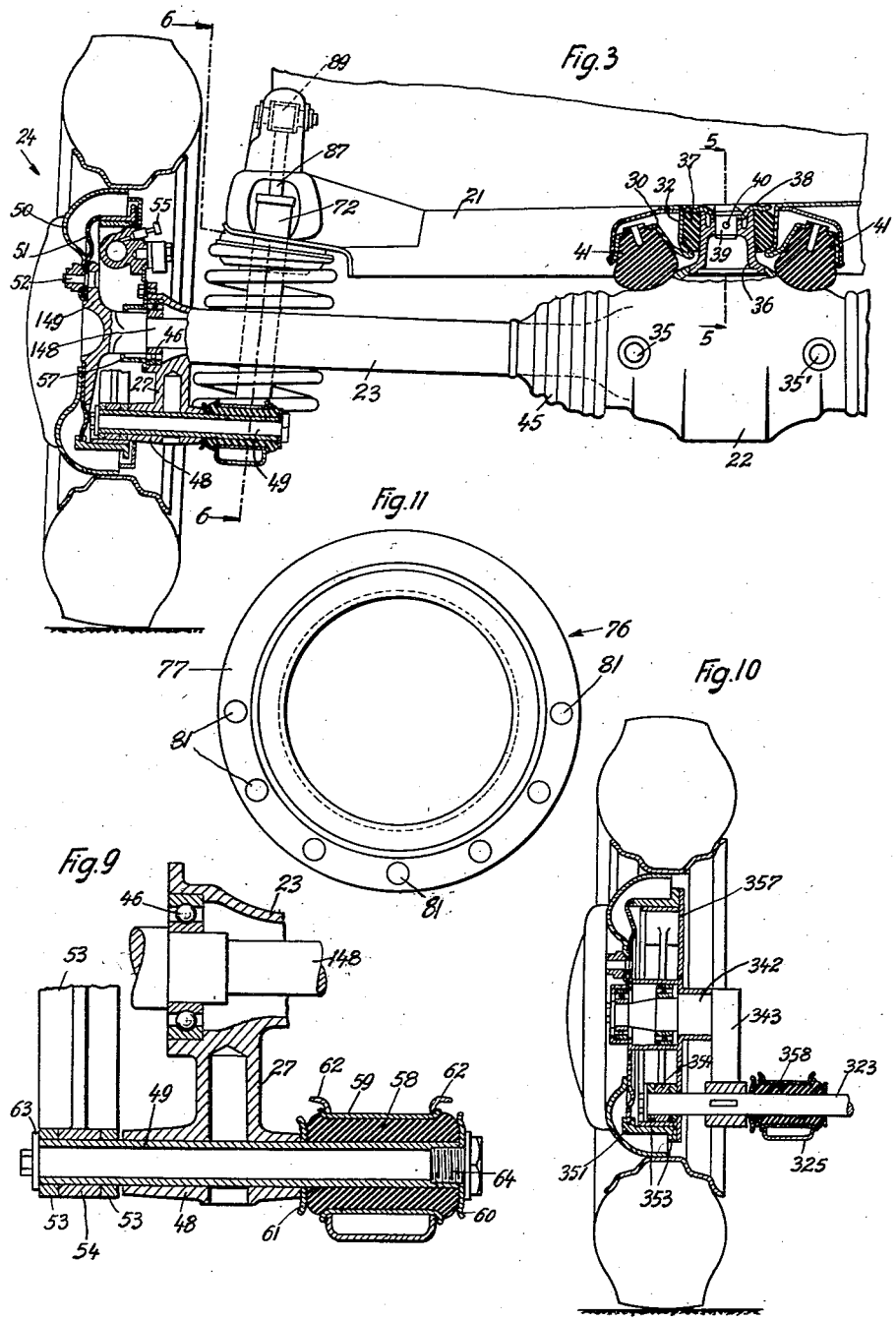

Sept. 17, 1957  J. MÜLLER  2,806,713
WHEEL SUSPENSION OF VEHICLES
Filed July 5, 1952  3 Sheets-Sheet 3
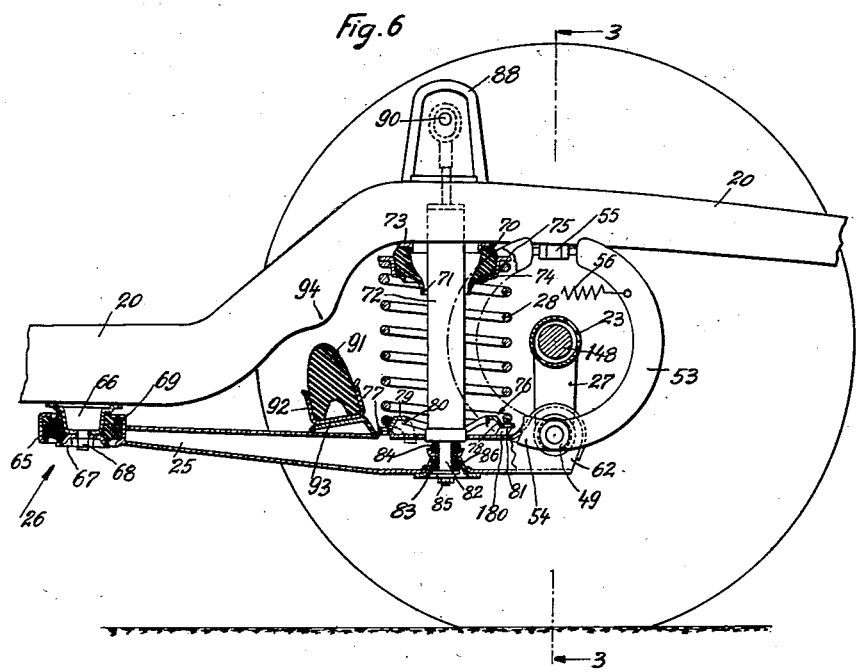
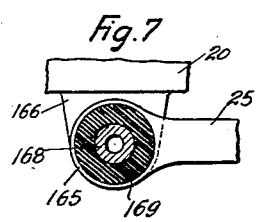
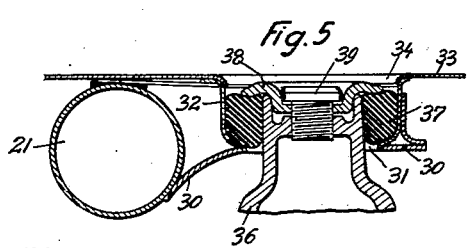
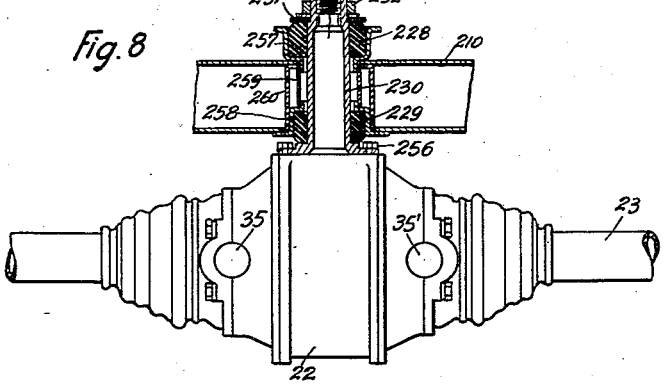
Inventor
Josef Müller
By Hicke and Padloy
Attorneys United States Patent Office 2,806,713
Patented Sept. 17, 1957

2,806,713
WHEEL SUSPENSION OF VEHICLES

Josef Müller, Stuttgart, Germany, assignor to Daimler-Benz Aktiengesellschaft, Stuttgart-Unterturkheim, Germany Application July 5, 1952, Serial No. 298,245

Claims priority, application Germany July 9, 1951

28 Claims. (Cl. 280—124)

My invention relates to the wheel suspension of vehicles and is particularly applicable to motor vehicles of the type in which the wheels are journalled on half-axles hinged for up and down motion to the axle transmission housing or a suitable bracket member fixed to the vehicle body. It is the object of my invention to provide improved means for so bracing the half-axles against the body as to relieve the hinges from thrust acting on the half-axles lengthwise of the vehicle without, however, shifting the half-axles to any substantial extent out of registry with a vertical transverse plane of the vehicle.

Further objects of my invention are to provide improved means for taking up the braking couple acting on the axle member; to provide a wheel suspension in which helical springs supporting the vehicle body on wheel guiding elements are disposed at a low level in front of the rear half-axles; to provide improved spring-adjusting means for helical springs, and to reduce the transfer of noise from the wheels to the body of the vehicle.

Further objects of my invention will appear from a detailed description of a number of embodiments thereof. It is to be understood, however, that such detailed description serves the purpose of explanation rather than limitation of the invention.

In the drawings:

Fig. 1 is a perspective diagrammatic view of my novel rear wheel suspension of a motor vehicle, the body proper being omitted.

Fig. 2 is a diagrammatic side view of a rear wheel suspended by my novel means, illustrating the movement performed by the various elements.

Fig. 3 is a partial rear view of the wheel suspension of the motor vehicle, partially shown in section taken along the line 3—3 of Figs. 2 and 6.

Fig. 4 is a view similar to that of Fig. 3 of a detail thereof on an enlarged scale.

Fig. 5 is a partial section of the means for attaching the axle transmission housing to the vehicle body, the section being taken along line 5—5 of Fig. 3.

Fig. 6 is a sectional view of the wheel suspension, the section being taken substantially along the broken line 6—6 of Fig. 3.

Fig. 7 illustrates a modified connection of the wheel guiding link to the vehicle body, shown partially in section.

Fig. 8 is a view similar to that of Fig. 3 of modified means for attaching the axle transmission housing to the vehicle body.

Fig. 9 is a detail illustrated in Fig. 3 shown on an enlarged scale.

Fig. 10 is a sectional view similar to that of Fig. 3 of a modified wheel suspension.

Fig. 11 is a plan view of a spring seating member shown in section in Fig. 6.

Fig. 12 is a view similar to that of Fig. 6 of a modified spring adjusting arrangement.

Fig. 13 is a plan view of a sheet metal fixture shown in section in Fig. 12.

The wheel body which may or may not include a detachable chassis is but diagrammatically represented as comprising longitudinal lateral hollow sheet metal beams 20 and a tubular transverse beam 21 connected therewith. A bracket member formed, for example, by the axle housing 22 is attached to the vehicle body for a restrained universal rocking motion by resilient means to be later described in detail. A pair of half-axles 23 is hinged to the bracket member 22 for up and down rocking motion and extends laterally therefrom. Wheels 24 are journalled on the free ends of the half-axle 23. The latter are braced against thrusts acting longitudinally of the vehicle by links 25 extending lengthwise of the vehicle. The forward end of each link 25 is pivotally connected to the vehicle body at a point designated in Figs. 1 and 6 by the numeral 26 and its rear end is pivotally connected to a depending arm or projection 27 integral with the half-axle 23. The body rests on a pair of helical springs 28, which are supported by the links 25 and are disposed in front of the half-axles. My invention is shown in Figs. 1 to 9 as applied to the driven wheels of a vehicle, the bracket member of which is formed by the axle transmission housing 22.

While the foregoing gives a general outline of my novel wheel suspension, the same will now be described in detail.

As shown in Figs. 3 and 5 a sheet metal member 30 which is welded to the hollow beam 21 extends rearwardly therefrom and is provided with an aperture 31. An annular sheet metal member 32 is welded to the edge of aperture 31 extending upwardly therefrom and having an upper outer flange welded to a flat sheet metal piece 33 provided with an aperture 34 located above and registering with the aperture 31. The member 32 has a lower inner flange. The piece 33 is welded to beam 21.

The bracket member constituted by axle transmission housing 22 is provided with an upstanding stud 36 which projects into the member 32 through the aperture 31 but is spaced from the edge thereof. Its upper end is surrounded by a ring shaped rubber cushion or rubber pad 37 which is located inside the annular sheet metal member 32 resting on the lower inner flange thereof. A washer 38 fixed to the stud 36 by a threaded bolt 39 projects outwardly therefrom and rests on the top face of the rubber pad 37 but is spaced from the sheet metal member 32.

Owing to this arrangement, the housing 22 is at liberty to perform a universal rocking motion about the center of the rubber cushion 37, said center being indicated in Fig. 3 at 40. The rocking motion will be counter-acted, of course, by the elastic forces exerted by the deformed annular pad 37 upon the stud 36 and the washer 38 and will thus be restrained to a certain extent.

It is desirable, however, that the rocking motion of the axle transmission housing 22 be restrained to a greater extent in a lateral direction with respect to the vehicle than in the fore-and-aft direction. For that purpose I have provided additional resilient means in form of a pair of rubber cushions 41 which are so mounted on either side of stud 36 as to counteract lateral oscillations of housing 22 without, however, substantially interfering with fore-and-aft oscillations thereof.

When the cushions 41 are in relieved condition, they have the shape of a tapered body of revolution and, more particularly an oval shape indicated by the dotted line 42 in Fig. 4.

Each cushion 41 is seated in an inverted cupshaped depression formed in the sheet metal member 30 and projects downwardly therefrom into contact with the housing 22. Normally each cushion is deformed so as to adopt the shape of a pear as shown in full lines in Figs. 3 and 4. However, it may be further deformed as indicated by the line 43 in Fig. 4. In this manner the cushion will exert upon housing 22 a restoring force which increases progressively with increasing deformation. The bottom of the cupshaped depression of sheet metal member 30 may be provided with a hole for projection therethrough of a detent portion 44 of the cushion which is so shaped as to hold the cushion in place upon disassembly of the housing 22.

The resilient means for mounting the housing 22 to the vehicle body comprising the annular pad 37 and the cushions 41 does not only permit a universal rocking motion of the housing, but will also act as a cushion in vertical direction minimizing the transfer of noise and vibration from the housing 22 to the body of the vehicle. While the annular pad 37 acts as a spring restraining downward motion of housing 22 relative to the body, the rubber cushions 41 will act as springs restraining upward motion of the housing 22 relative to the body.

Each half-axle 23 is formed by a tubular member, the inner flaring end of which extends into housing 22 through a lateral aperture thereof and is hinged therein by a pair of trunnions 35 and 35', the rear trunnion being visible in Fig. 3. The axes of the two hinges of the pair of half-axles 23 extend parallel to one another and horizontally, when the stud 36 of the housing 22 assumes its vertical position shown in Fig. 5. A bellows 45 fixed to the housing 22 and the half-axle 23 serves to seal the gap therebetween.

The flaring free end of the half-axle 23 accommodates an internal ball-bearing 46 and is integral with the depending arm 27 provided with a sleeve shaped head 48 in which a hollow pin 49 is mounted so as to project on either side therefrom.

The axes of the pins 49 extend parallel to the half-axles 23 in a common plane therewith, which intersects the axes of the hinges 35 at right angles and includes the axis of stud 36. This is true irrespective of the up-and-down movement of the half-axles. Such common plane will be referred to hereinafter as the "axle plane."

A shaft 148 journalled in the ball-bearing 46 extends through the tubular half-axle 23 into the housing 22 to be driven by the axle transmission elements encased therein and its outer end carries the hub disk 149 of the wheel 24, to which both, the wheel disk 50 and a brake drum 51, are attached by bolts 52. A pair of brake shoes 53 and 54 is provided within the brake drum 51 being both formed with eyes pivotally mounted on the outer end of the pin 49. As fluid-actuated ram 55 is interposed between the upper ends of the brake shoes 53 and 54 for the actuation thereof, and the brake shoes are connected by a traction spring 56. The brake drum is closed by a sheet metal member 57, which is fixed to the half-axle 23 and its arm 27, and has a peripheral flange overlying the periphery of the brake drum 51 and carries the ram 55.

On the other end of the pin 49 projecting inwardly from the head 48 there is mounted a rubber bushing 58 (Figure 9), provided with an outer sheet metal cylinder 59 preferably bonded thereto by a vulcanizing process. To the pin 49 an outer washer 60 bearing against the rubber cushion 58 without, however, contacting the sheet metal member 59, is attached by a threaded bolt 64 engaging internal threads of pin 49. A washer 61 is inserted between the rubber pad 58 and the head 48, but this washer too is spaced from the sheet metal cylinder 59. In this manner the transfer of vibration and noise from the pin 49 to the sheet metal cylinder 59 is limited to a minimum. The sheet metal cylinder 59 extends thorugh co-axial openings provided in the side walls 62 of a channel member which constitutes the link 25, the member 59 being suitably secured to the side walls 62 by welding or otherwise. The other end of the pin 49 is formed with a flange 63 forming an abutment for the eye of the brake shoe 53.

The forward end of the link 25 is formed with an eye 65 having a vertical axis and surrounding a stud formed by two adjoining cup-shaped sheet metal members 66 and 67 attached to one another by a threaded bolt and a nut 68. The member 66 is welded or otherwise connected to the bottom side of the associated beam 20. A ring shaped rubber pad 69 surrounds the stud 66, 68 and is embraced by the eye 65 and retained therein by upper and lower flanges thereof which are spaced from the sheet metal parts 66 and 67. In this manner the link 25 is pivotally connected to the vehicle body for universal relative rocking motion.

The helical spring 28 supports an element mounted on the vehicle body and is itself supported by the wheel guiding element constituted by the link 25. In the present embodiment of the invention, the element mounted on the vehicle body is an annular rubber cushion 70 which is formed with a sleeve 71 closely surrounding a shock absorber 72 disposed co-axially within the helical spring 28. The top of the cushion 70 is provided with a sheet metal fixture 73 suitably fixed to the beam 20, while the lower portion of the periphery of the annular rubber cushion 70 is provided with a sheet metal ring 74 having a flange 75 which rests on the helical spring 28 and has a substantially plane seating face engaging the upper end of the spring. The elements 73 and 74 are suitably spaced, and the cushion 70 is so dimensioned as to be capable of transferring the weight of the body to the helical spring.

The wheel guiding element, which in the present embodiment is formed by the link 25, is provided with a helical seating face engaging the helical endwinding of the spring.

For that purpose I have equipped the link 25 with a substantially ring shaped sheet metal member designated as a whole by 76 shown in Figs. 6 and 11. The cross-section of this sheet metal member comprises a basic horizontal leg 77, an adjoining upwardly slanting leg 78 and an adjoining upper horizontal leg 79 and a downwardly bent edge portion 80. However, the seating face formed by the leg 77 does not extend within a plane, but is helically shaped so as to conform to the lowermost winding of the spring 28. Between its lowest level and its highest level the annular sheet metal portion constituting the leg 77 is formed with a transitional step 180 against which the end of the lowermost spring winding may rest when the spring is angularly adjusted to its lowermost position. The spring, however, is rotatable about the shock absorber 72. Therefore, it may be so rotatably adjusted as to space its lower end from the step 180 and as to move its lowermost winding upwards on the helical seating face. Means are provided for optionally holding the spring in any one of a plurality of different angular positions of the seating face. For this purpose, the sheet metal member formed by the leg 77 may be provided with a plurality of holes 81. The end of the lowermost winding of the spring 28 is either turned downwardly or provided with a downwardly extending projection, which engages a selected one of the holes 81. The sheet metal member 76 rests on a conforming face of link 25 and may be welded thereto.

The cylindrical housing of the shock absorber 72 is provided with a downwardly extending stem 82 secured to the link 25 by means of two rubber bushings 83 and 84 which are held on pin 82 by a nut 85 and embrace between them a cup shaped sheet metal part 86 welded to the web of the link 25. The piston rod 87 (Figure 3) of the shock absorber extends through an aperture provided in beam 20 and into a sheet metal dome 88 welded thereto and has an eye 89 pivotally mounted on a pin 90 by means of an interposed rubber sleeve, the pin 90 being mounted in the walls of the dome 88. The sleeve-shaped portion 71 of the rubber cushion 70 seals the interior of the dome and thus protects the piston rod of the shock absorber from dirt and moisture.

The downward motion of the vehicle body relative to the wheel and the half-axle 23 is limited by a rubber buffer 91 inserted in a cup-shaped sheet metal fitting 92 attached to a sheet metal bracket 93 welded to the link 25 in front of the spring 28. The frame is formed with an abutting face 94 adapted to contact the buffer 91.

While I have described the suspension of the wheel shown in Fig. 3, it is to be understood that the other wheel is suspended by similar elements in the same fashion.

The function of my novel wheel suspension will now be explained with reference to the diagram in Fig. 2. In normal position, i. e. when the vehicle carries a normal load, the link 25 extends substantially horizontally holding the above defined axle plane including the arm 27 in vertical position. In this position the axle plane coincides with a vertical transverse plane which includes the axis of the annular member 32 and will be termed "normal plane" hereinafter. When the wheel rolling over an obstruction swings upwardly, the half-axle 23 is constrained by hinge 35 to move within the axle plane. However, since the pin 49 in the lower end of arm 27 is guided on an arc of a circle indicated at 95, the axle 23 will be slightly turned about its axis in clockwise direction with reference to Figs. 2 and 6, rocking the housing 22 forwardly. As a result, the axle plane will be deflected out of coincidence with the normal plane, and both the center of the wheel and the pin 49 are displaced from the normal plane in forward direction. However, the wheel center will be so displaced to a much lesser degree than the pin 49 in the lower end of arm 27. In Fig. 2 I have indicated the upper inclined position of arm 27 at 27' and the upper position of link 25 at 25'. The center of the wheel moves from 23 to 23'. Thus it will appear that the inclination of arm 27 shown in Fig. 2, which is rendered possible by the resilient attachment of housing 22 to the body of the vehicle, permits the center of the wheel to move on a curved path 96 which is much less curved than the arc 95 and will, therefore, result in a much smaller departure of half-axle 23 from the normal plane 3—3 of Fig. 2 than the departure of the pin 49 which moves to the point 49'. As any such departure causes the wheel to turn about a vertical axis, in a fashion similar to the steering effect of a front wheel, it is obvious that such departure should be limited to a minimum.

While I have described a preferred embodiment of my invention, I wish to be clearly understood that my invention is in no way limited to the details of such embodiment, but is capable of numerous modifications within the scope of the appended claims.

Thus in Fig. 7 I have shown a modified pivotal connection of the link 25 to beam 20. The eye 165 provided on the link 25 in this embodiment has a horizontal axis and is positioned between two bracket members 166 attached to and projecting from the beam 20 and carrying a horizontal pin 168 which extends through the eye 165 and carries a rubber sleeve 169 embraced by the eye.

In Fig. 8 I have shown a modified resilient mounting of the rear axle housing 22 to the vehicle body. In this embodiment the housing 22 has an upright stud 136 carrying the rubber bushings 228 and 229 which are inserted in metal sleeves 257 and 258 spaced by sleeves 259 and 260 and suitably attached to a hollow sheet metal beam 210 of the vehicle. The pin 136 has a lower flange attached to the housing 22 by threaded bolts 256. A nut 232 and a washer 231 are mounted on the pin 136 and bear against the rubber bushing 228. In this manner both rubber bushings can be tensioned. In this arrangement too, the flanged metal sleeves 257 and 258 are spaced from the pin 136 and the elements rigidly connected therewith whereby the housing 22 will be given freedom of universal oscillation relative to the vehicle body.

In Fig. 10 I have shown my improved brake shoe mounting applied to a vehicle in which a pair of wheels is carried by a rigid axle 323. A stub shaft 342 carrying the wheel is connected by a crank arm 343 with the rigid axle 323 disposed beneath the stub shaft 342. The link 325 is mounted on the axle 323 by means of an interposed rubber bushing 358 and extends forwardly to the point 26 of attachment to the vehicle body. The axle 323 projects outwardly beyond the crank arm 343 and the projecting end carries the brake shoes 353 and 354 cooperating with a brake drum 351 attached to the wheel, a cover plate 357 being fixed to the stub shaft 342. No means are provided in this embodiment to drive the wheel. The crank arm 343 is keyed on the axle 323, and the latter is secured against rotation under the effect of the braking couple by suitable means as shown.

In Figs. 12 and 13 I have shown a modified connection between the spring 28 and the link 25. In this embodiment the lowermost winding of the spring is armed with a sheet metal fixture in form of a ring 97 which is similar to the sheet metal member 76 shown in Figs. 6 and 11. However, the ring is not provided with any holes, such as holes 81, Fig. 11, and, therefore, the end of the lowermost spring winding will permanently rest on the step corresponding to the step 180, Fig. 6. The ring 97 in its turn rests on a helical seating face 98 formed by a top plate 99 with which link 25 is provided. Therefore, the elevation of ring 97 can be varied by rotational adjustment. The ring 97 is held in its selected position by suitable means, such as two bolts 100, which are attached to the top plate 99 and engage internal recesses 101 of ring 97.

All of the rubber cushions interposed between the various components of my novel wheel suspension, such as the cushions 37, 41, 58, 70, 83, 84, 91, 169, 228 and 229, may be bonded to the adjoining metal fixtures by a vulcanizing process in a known manner.

Prior to my invention, two different kinds of suspensions of half-axles were widely used. In one kind of suspension the half-axles are guided for rocking motion solely by the hinges connecting them to the axle transmission housing or other bracket member. All thrusts acting lengthwise and transversely on the wheel of the vehicle are transferred to such bracket member through the half-axle. In the second kind of suspension each half-axle is composed of two strut members mounted at an angle to one another, one strut member extending transversely of the vehicle and being carried by the axle transmission housing or other bracket member while the other strut member extends longitudinally of the vehicle and is pivotally connected to the body of the vehicle, for instance to a longitudinal beam thereof at a point located at the side of the vehicle. In this case, each half-axle oscillates about an axis extending through the points of connection of the two axle struts to the body or the transmission housing connected thereto, such axis extending at an acute angle to the vertical, longitudinal central plane of the vehicle. When the wheels move up and down, the axes are guided on conical faces. As a result, the wheels are constrained during such up and down motion to assume positions oblique to the direction of travel, thus producing an undesirable steering effect.

My novel suspension is far superior to such prior suspensions in that it results in an unobjectionable guidance of the wheels and in a favorable transfer of all forces from the wheels to the body whereby the wheel guiding elements are relieved from bending stresses to a considerable extent and may, therefore, be made very light and will nevertheless guarantee a reliable guidance of the wheels.

Moreover, the absence in my novel wheel suspension of diagonal axle struts used in prior systems involves the great advantage that the space required for such prior diagonal struts can be used for other purposes, for instance for accommodating the fuel tank, baggage compartments or for other purposes. Another advantage of my novel wheel suspension is the low location of the helical springs and the favorable accessibility of the springs, of the shock absorbers, and of the various elements requiring service.

The interposition of the rubber bushings or other rubber elements in the joints of the various components of the suspension will greatly minimize the transfer of noise and vibration from the wheels to the body of the vehicle. A reliable guidance of the half-axles does not require the use of very tough rubber compositions for such bushings but the latter may be made of soft rubber without jeopardizing the guidance of the wheels and without involving the risk of an oblique displacement of the axles since the lateral links 25 will securely keep the half-axles in transverse relationship to the vehicle body.

More particularly, the suspension constitutes a triangular system indicated in Fig. 1 by cross-hatching, such triangle being located in the plane of oscillation of the half-axle 23 which was termed the "axle plane" above. The corners of the triangle are the joints formed by the rubber bushings surrounding the pins 49 and 36. In Fig. 2 such joints are denoted by the same reference numerals 49 and 36. In horizontal direction the triangle is rigidly held by the links 25. The joints 26 and 49 of such links constitute a substantially horizontal parallelogram which guides the triangular system 49, 36, 49 which is rigid in the horizontal plane for parallel motion and thereby prevents the axle system from assuming an oblique position upon transverse oscillations. The bracket member 22 may rock about the joint 36 to the right or to the left being supported in doing so by the rubber cushions 41 acting as springs which restore the bracket member 22 to its normal position and thus keep the axle system in its stable central position. When both wheels are raised equal amounts, i. e. when the two joints 49 are lifted together to the same extent, they move along the arc 95 of a circle about the joints 26, for instance into the position 49'. During much movement the axle system is retained at right angles to the direction of travel. When the two wheels move unequal amounts, for instance in such a manner that one of the two joints 49 arrives in the position 49' whereas the other joint 49 remains in its initial position, the center of the wheel will be lifted to the position indicated at 23'. It will appear that the departure of the point 23' from the plane 3—3 is considerably less than the departure of the joint 49' from the plane 3—3. Accordingly, the arc 96 described by the axle 23 has a much larger radius than the arc 95 described by pin or joint 49. Since the triangular axle system 49, 36, 49 is rigid in a horizontal plane it will rock about the straight line connecting joint 49 of the other half-axle with the joint 36 whereby the wheel will be steered out of its direction of travel to negligible extent only.

Another advantage of my novel suspension is the direct transfer of the forces acting on the brake shoes to the arms 27 and to the links 25 while the cover sheet metal plate of the brake drum is relieved from stresses.

My novel spring adjusting system involving the sheet metal washers having a helical seating face offers the advantage of a greatly facilitated adaptation of the springs which usually differ in length from the standard dimension and therefore require adjusting means for proper assembly. Prior to my invention exchangeable washers were used for that purpose.

What I claim is:

1. In a vehicle, the combination comprising a vehicle body, a bracket member, means for mounting said bracket member on said vehicle body for universal rocking motion including resilient means interposed between said vehicle body and said bracket member and adapted to restrain said universal rocking motion, a pair of wheels on opposite sides of said vehicle, a pair of half-axles, hinge means with the rocking axes thereof extending substantially lengthwise of said vehicle for connecting said half-axles to said bracket member for up and down rocking motion only, each of said half-axles supporting one of said wheels to guide the same with respect to said bracket member, said half-axles forming a rigid system in a horizontal plane with said bracket member swingable about said mounting means, and a pair of links extending between and each pivotally connected to one of said half-axles and said vehicle body, said links extending substantially lengthwise of said vehicle, the pivotal connection of said links to said vehicle body lying outside the rocking axes of said hinge means connecting said half-axles to said bracket member.

2. In a vehicle, the combination comprising a vehicle body, a bracket member, means for mounting said bracket member on said vehicle for a universal rocking motion including elastic cushions interposed between said vehicle body and said bracket member and adapted to restrain said universal rocking motion, a half-axle extending from said bracket member outwardly, a wheel journalled on the outer end of said half-axle, means for hingedly connecting the inner end of said half-axle to said bracket member with the rocking axis thereof extending substantially lengthwise of said vehicle for up and down motion only of said wheel, said half-axle forming a rigid system in a horizontal plane with said bracket member swingable about said mounting means, and a link extending substantially lengthwise of said vehicle between and pivotally connected to the outer end of said half-axle and said vehicle body, the pivotal connection of said link to said vehicle body lying outside the rocking axis of said hinge means connecting said half-axle to said bracket member.

3. In a vehicle the combination comprising a vehicle body, an axle transmission housing, means for attaching said housing to the vehicle body for a universal rocking motion, said means including resilient cushions interposed between said vehicle body and said housing and adapted to restrain said universal rocking motion, a pair of half-axles extending from said housing laterally, a pair of parallel hinges with the rocking axes thereof extending fore-and-aft substantially lengthwise of said vehicle and connecting the inner ends of said half-axles to said housing, said half-axles forming a rigid system in a horizontal plane with said bracket member swingable about said attaching means, wheels journalled on the outer ends of said half-axles, and a pair of links extending lengthwise of said vehicle, each link extending between and being pivotally connected to one of said half-axles near the outer end thereof and said vehicle body, the pivotal connection of said links to said vehicle body lying outside the rocking axes of said hinges connecting said half-axles to said housing.

4. In a vehicle the combination comprising a vehicle body, a bracket member, mounting means for attaching said bracket member to said vehicle body for a universal rocking motion, said means including resilient members interposed between said vehicle body and said bracket member and adapted to restrain said universal rocking motion, a half-axle extending from said bracket member laterally, a hinge including means for connecting said half-axle to said bracket member about a rocking axis extending substantially lengthwise of said vehicle and located on said bracket member at a level lower than that of said mounting means and to guide said half-axle for up and down rocking motion, said half-axle forming a rigid system in a horizontal plane with said bracket member swingable about said mounting means, a wheel journalled on the outer end of said half-axle, and a link extending substantially lengthwise of said vehicle between and pivotally connected to said vehicle body and to a point of said half-axle off-set from and beneath a line connecting said hinge to the center of said wheel, the pivotal connection between said link and said vehicle body lying outside the rocking axis of said hinge connecting said half-axle to said bracket member.

5. The combination claimed in claim 4 in which said resilient members comprise annular cushions consisting of an elastic material having a substantially upright axis.

6. The combination claimed in claim 1 including a universal joint pivotally connecting said link to said vehicle body.

7. The combination claimed in claim 1 including rubber cushions interposed between the ends of said link, said half-axle and said vehicle body.

8. The combination claimed in claim 1 including a rubber sleeve provided to pivotally connect said link to said half-axle, the axis of said rubber sleeve being substantially horizontal.

9. In a vehicle, the combination comprising a vehicle body, a bracket member, resilient means for mounting said bracket member on said vehicle body at one point only for a restrained universal rocking motion, a half-axle hinged to said bracket member about a rocking axis extending substantially lengthwise of said vehicle for up and down rocking motion only, said half-axle forming a rigid system in a horizontal plane with said bracket member swingable about said mounting means, a link extending lengthwise of the vehicle between said half-axle and said vehicle body, and means for pivotally connecting said link to said body, said last-mentioned means lying outside said rocking axis.

10. The combination claimed in claim 9 in which said resilient means comprise an upright stud, a sleeve surrounding same, and at least one rubber bushing between said stud and said sleeve.

11. In a vehicle, the combination comprising a vehicle body including a member of sheet metal having an opening disposed within the longitudinal vertical central plane of said body, a rear-axle housing located beneath said member and provided with an upright stud projecting therethrough, rubber cushions located within said member and projecting downwardly therefrom into contact with said housing, a rubber bushing surrounded by said member and surrounding said stud, a washer fixed to said stud and overlying said bushing spaced from said member, the latter being spaced from said stud, a pair of half-axles hinged to said housing for up and down rocking motion only, said half-axles forming a rigid system in a horizontal plane with said rear axle housing, wheels journalled on said half-axles, a pair of links each extending lengthwise of said vehicle between and pivotally connected to one of said half-axles and said vehicle body, and a pair of upright helical springs each bearing on one of said links and supporting said body.

12. The combination claimed in claim 1 in which sound insulating rubber inserts are interposed between said vehicle body, on the one hand, and said bracket, said half-axles and said link, on the other hand.

13. In a vehicle, the combination comprising a vehicle body, a rear-axle housing, means including rubber fixtures for attaching said housing to said body for a restrained universal rocking motion, a pair of half-axles, means for hinging said half-axles to said housing about rocking axes extending substantially lengthwise of said vehicle for up and down rocking motion, said half-axles forming a rigid system in a horizontal plane with said rear axle housing swingable about said first-mentioned means, wheels journalled on the free ends of said half-axles, a pair of links, each link extending lengthwise of the vehicle and pivotally connected to one of said half-axles near the wheel-carrying end thereof and said vehicle body, and upright helical springs resting on said links and supporting said vehicle body, the pivotal connection between each of said links and the associated half-axle being located beneath and spaced from the axis of the associated wheel and lying outside the rocking axes of said hinge means.

14. The combination claimed in claim 13 in which telescopic shock absorbers are disposed inside of said helical springs, rubber joints being provided between said shock absorbers and said links and said body.

15. The combination claimed in claim 13 in which rubber cushions are interposed between said links and said body, to limit the relative movement thereof.

16. In a vehicle the combination comprising a vehicle body, an axle member, a wheel journalled on said axle member, a link extending substantially lengthwise of said vehicle means for pivotally connecting said link with said body and said axle member, a brake including brake shoes mounted on said axle member to be swingable about a secondary axis located beneath and spaced from the axis of said wheel, the pivotal connecting means between said link and said axle member being co-axially related to said secondary axis.

17. In a vehicle, the combination comprising a vehicle body, an axle transmission housing, resilient means for mounting said housing on said vehicle body for a restrained universal rocking motion, a half-axle hinged to said housing for up and down rocking motion, a journal supported by the free end of said half-axle, a wheel rotatable on said journal, said half-axle being provided near its free end with a depending arm, a pivot pin carried by said arm, a link extending lengthwise of said vehicle between and pivotally connected to said vehicle body and said pin, and a brake associated with said wheel and including a pair of brake shoes swingably mounted on said pin.

18. In a vehicle, the combination comprising a vehicle body, a half-axle, means pivotally connecting said half-axle to said vehicle body, said half-axle rigidly including a wheel support member with a journal thereon, a wheel rotatable on said journal, a pivot pin attached to said wheel support member beneath said journal, a brake associated with said wheel and including a pair of brake shoes swingably mounted on said pivot pin, and a link connecting said pivot pin to said body for up and down guidance of said wheel.

19. The combination claimed in claim 18 in which a rubber bushing is interposed between said pivot pin and said link.

20. In a motor vehicle, the combination comprising a vehicle body, an axle transmission housing, resilient means for attaching said transmission housing to said body, a tubular half-axle linked to said housing for up and down rocking motion and formed near its free end with a depending arm, a wheel rotatably mounted on the free end of said half-axle in co-axial relationship thereto, a driving shaft fixed to said wheel and extending through said half-axle into said transmission housing, a pin mounted in said depending arm parallel to said half-axle, a brake drum fixed to said wheel, a pair of brake shoes disposed within said drum and swingably mounted on one end of said pin, a link having one of its ends swingably mounted on the other end of said pin and extending lengthwise of said vehicle and having its other end swingably connected to said body, and a helical spring resting on said link and supporting said body.

21. In a vehicle, the combination comprising a vehicle body, a bracket member, means for mounting said bracket member on said vehicle body for universal rocking motion including resilient means interposed between said vehicle body and said bracket member and adapted to restrain said universal rocking motion, a pair of wheels on opposite sides of said vehicle, a pair of half-axles, hinge means for connecting said half-axles to said bracket member for up-and-down rocking motion only, each of said half-axles supporting one of said wheels to guide the same with respect to said bracket member, said half-axles forming a rigid system in a horizontal plane with said bracket member swingable about said mounting means, a link extending between and pivotally connected to one of said half-axles and said vehicle body, said link extending substantially lengthwise of said vehicle, and means including an annular rubber member pivotally connecting said link to said vehicle body, said member having a substantially upright axis.

22. In a vehicle, the combination comprising a vehicle body, a bracket member, means for mounting said bracket member on said vehicle body for universal rocking motion including resilient means interposed between said vehicle body and said bracket member and adapted to restrain said universal rocking motion, a pair of wheels on opposite sides of said vehicle, a pair of half-axles, hinge means for connecting said half-axles to said bracket member for up-and-down rocking motion only, each of said half-axles supporting one of said wheels to guide the same with respect to said bracket member, said half-axles forming a rigid system in a horizontal plane with said bracket member swingable about said mounting means, a link extending between and pivotally connected to one of said half-axles and said vehicle body, said link extending substantially lengthwise of said vehicle, said means for mounting said bracket member including a connecting member of elastic material fixed to both said vehicle body and said bracket member and disposed within the vertical central longitudinal plane of the vehicle, and a pair of cushions of elastic material disposed on either side of said plane between said vehicle body and said bracket member.

23. In a vehicle, the combination comprising a vehicle body, a bracket member, means for mounting said bracket member on said vehicle body for universal rocking motion including resilient means interposed between said vehicle body and said bracket member and adapted to restrain said universal rocking motion, a pair of wheels on opposite sides of said vehicle, a pair of half-axles, hinge means for connecting said half-axles to said bracket member for up-and-down rocking motion only, each of said half-axles supporting one of said wheels to guide the same with respect to said bracket member, said half-axles forming a rigid system in a horizontal plane with said bracket member swingable about said mounting means, a link extending between and pivotally connected to one of said half-axles and said vehicle body, said link extending substantially lengthwise of said vehicle, said means for mounting said bracket on said vehicle body for universal rocking motion comprising a vertical stud, an annular rubber member surrounding said stud, and a sleeve surrounding said rubber member, said sleeve and said stud being rigidly connected to said bracket member and to said vehicle body respectively.

24. In a vehicle, the combination comprising a vehicle body, a bracket member, means for mounting said bracket member on said vehicle body for universal rocking motion including resilient means interposed between said vehicle body and said bracket member and adapted to restrain said universal rocking motion, a pair of wheels on opposite sides of said vehicle, a pair of half-axles, hinge means for connecting said half-axles to said bracket member for up-and-down rocking motion only, each of said half-axles supporting one of said wheels to guide the same with respect to said bracket member, said half-axles forming a rigid system in a horizontal plane with said bracket member swingable about said mounting means, a link extending between and pivotally connected to one of said half-axles and said vehicle body, said link extending substantially lengthwise of said vehicle, said means for mounting said bracket member on said vehicle body for universal rocking motion including a rubber bushing, a stud inside said bushing and rigidly connected with said bracket member and having a flange overlying said bushing, a sleeve surrounding said bushing and rigidly connected to said body and having a flange underlying said bushing, said resilient means also including a pair of rubber cushions located on either side of said bushing and interposed between said vehicle body and said bracket member.

25. In a vehicle, the combination comprising a vehicle body, a wheel support member, a journal on said wheel support member, a wheel rotatable on said journal, a pivot pin attached to said wheel support member beneath said journal, a brake associated with said wheel and including a pair of brake shoes swingably mounted on said pivot pin, and a link connecting said pivot pin to said body for up-and-down guidance of said wheel, said pivot pin being attached to said wheel support member intermediate the ends thereof, one end of said pin carrying said brake shoes and the other end of said pin carrying said link.

26. The combination according to claim 1, wherein said resilient means includes joint means determining a swinging axis of said bracket member with respect to said vehicle body about a longitudinal vehicle axis, and elastic elements disposed laterally with respect thereto to elastically limit the swinging movements of said bracket member about said swinging axis.

27. The combination according to claim 1, wherein said resilient means includes a plurality of rubber elements, a central one of said rubber elements supporting said bracket member with respect to said vehicle body in the horizontal direction and determining a swinging axis of said bracket member with respect to said vehicle body about a longitudinal vehicle axis, and lateral ones of said rubber elements elastically limiting the swinging movements of said bracket member about said swinging axis.

28. The combination according to claim 27, wherein said central rubber element is formed as a rubber ring having a vertical axis, in combination with support elements for supporting said rubber ring in at least a radial and axial direction on said vehicle body and in at least an opposite direction on said bracket member, and wherein said lateral rubber elements are formed as rubber blocks interposed between said vehicle body and said bracket member and supporting said two last-mentioned parts against each other about said central rubber ring in one rotational direction each.

References Cited in the file of this patent

UNITED STATES PATENTS

| | | |
|---|---|---|
| 731,753 | Charron | June 23, 1903 |
| 1,238,105 | Church | Aug. 28, 1917 |
| 1,746,017 | Smith | Feb. 4, 1930 |
| 2,010,415 | Roller | Aug. 6, 1935 |
| 2,129,232 | Paton | Sept. 6, 1938 |
| 2,145,670 | Tjaarda | Jan. 31, 1939 |
| 2,300,844 | Olley | Nov. 3, 1942 |
| 2,314,505 | McIntyre et al. | Mar. 23, 1943 |
| 2,367,817 | Brown | Jan. 23, 1945 |
| 2,661,206 | Gregoire | Dec. 1, 1953 |
| 2,689,015 | Nallinger | Sept. 14, 1954 |